3 Sheets—Sheet 1.

L. YALE, Jr., Dec'd, S. N. BROOKS, Adm'r.

Assignor to YALE LOCK MANUFACTURING CO.

Lock.

No. 8,158. Reissued April 2, 1878.

WITNESSES

Wm A. Skinkle

Geo W. Breck.

INVENTOR

Silas N. Brooks.

ADMINISTRATOR OF THE ESTATE OF LINUS YALE JR DECEASED.

By his Attorneys

Baldwin, Hopkins & Peyton.

3 Sheets—Sheet 2.

L. YALE, Jr., Dec'd, S. N. BROOKS, Adm'r.

Assignor to YALE LOCK MANUFACTURING CO.

Lock.

No. 8,158. Reissued April 2, 1878.

WITNESSES

Wm. A. Skinkle

Geo. W. Breck

INVENTOR

Silas N. Brooks

ADMINISTRATOR OF THE ESTATE OF LINUS YALE JR DECEASED

By his Attorneys

Baldwin, Hopkins, & Peyton.

3 Sheets—Sheet 3.

L. YALE, Jr., Dec'd, S. N. BROOKS, Adm'r.

Assignor to YALE LOCK MANUFACTURING CO.

Lock.

No. 8,158. Reissued April 2, 1878.

WITNESSES

Wm. A. Skinkle

Geo W. Breck.

By his Attorneys.

Baldwin, Hopkins, & Peyton.

INVENTOR

Silas N. Brooks

ADMINISTRATOR OF THE ESTATE OF LINUS YALE JR DECEASED.

UNITED STATES PATENT OFFICE.

SILAS N. BROOKS, OF CHICAGO, ILLINOIS, ADMINISTRATOR OF LINUS YALE, JR., (DECEASED,) ASSIGNOR TO YALE LOCK MANUFACTURING COMPANY, OF STAMFORD, CONNECTICUT.

IMPROVEMENT IN LOCKS.

Specification forming part of Letters Patent No. 48,475, dated June 27, 1865; Reissue No. 8,158, dated April 2, 1878; application filed November 30, 1877.

*To all whom it may concern:*

Be it known that LINUS YALE, Jr., deceased, late of Shelburne Falls, in the county of Franklin and State of Massachusetts, during his life-time invented a new and useful Improvement in Door-Locks; and I, SILAS N. BROOKS, administrator of the estate of the said LINUS YALE, Jr., deceased, do hereby declare the following to be a full, clear, and exact description thereof, reference being had to the accompanying drawings, in which—

Figure 2:
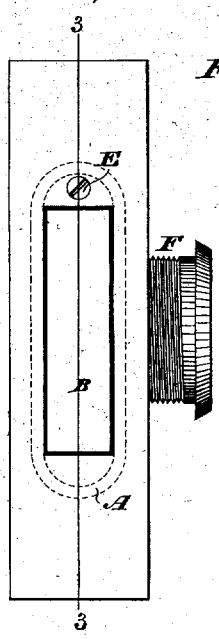
Figure 1:
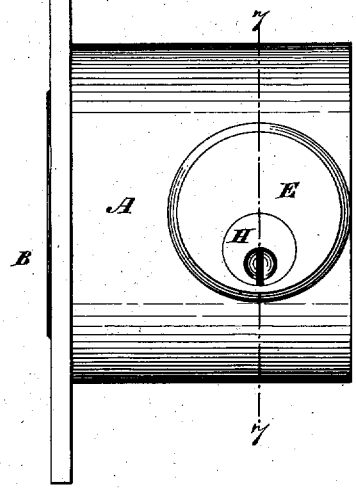
Figure 4:
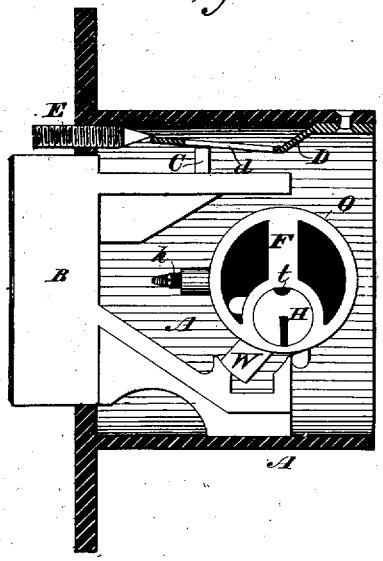
Figure 3:
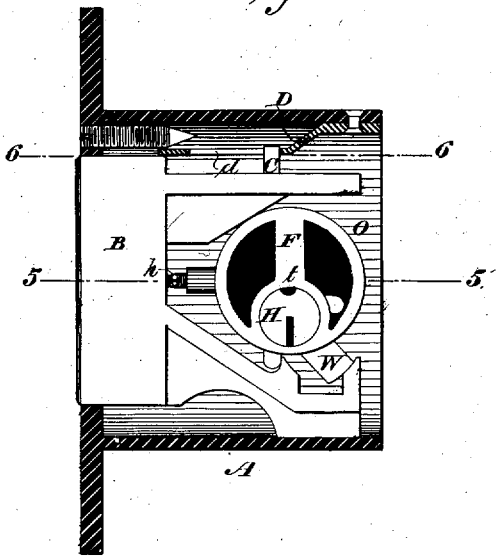
Figure 5:
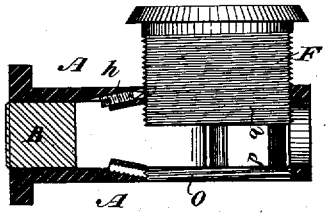
Figure 6:
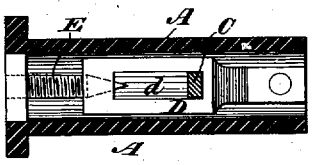
Figure 7:
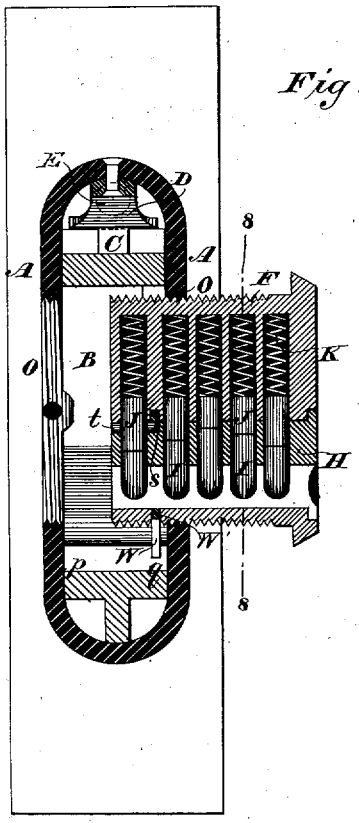
Figure 8:
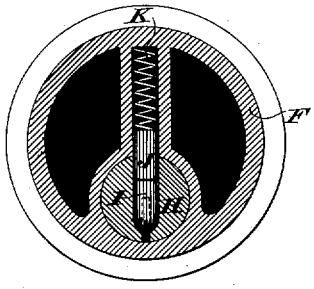
Figure 9:
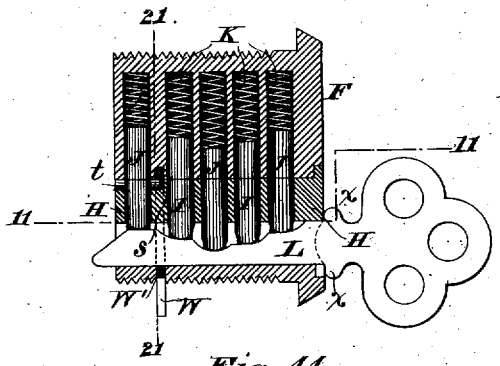
Figure 10:
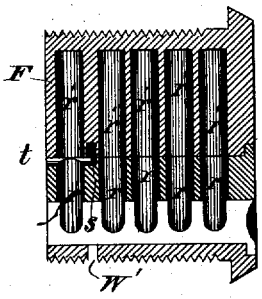
Figure 11:
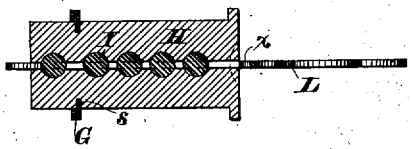
Figure 12:
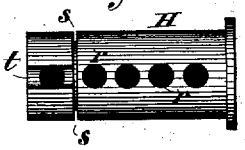
Figure 16:
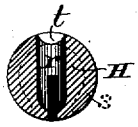
Figure 15:
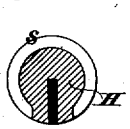
Figure 14:
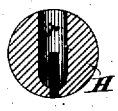
Figure 13:
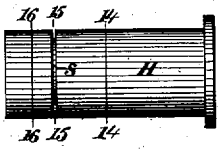
Figure 20:
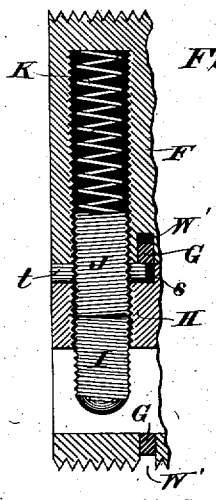
Figure 17:
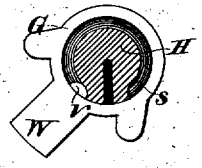
Figure 18:
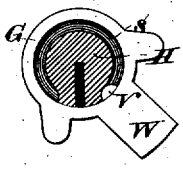
Figure 19:
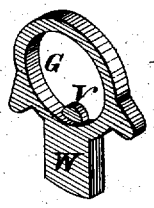

Figure 1 is a view of a lock containing all my improvements; Fig. 2, a front elevation of the same; Fig. 3, a vertical longitudinal section on the line 3 3 of Fig. 2, showing the bolt retracted and the bolt-securer down in place; Fig. 4, a similar section, showing the bolt shot forward and the bolt-securer in the elevated position to permit the insertion of the bolt; Fig. 5, a horizontal longitudinal section on the line 5 5 of Fig. 3; Fig. 6, a similar section on the line 6 6 of Fig. 3, showing a bottom-plan view of the spring-bolt securer and its locking-screw; Fig. 7, a vertical transverse section on the line 7 7 of Fig. 1; Fig. 8, a vertical section on the line 8 8 of Fig. 7; Fig. 9, a vertical longitudinal section through the center of the tumbler-case, showing the key inserted in the key-cylinder and the tumblers raised to the unlocked position; Fig. 10, a similar section through the tumbler-case and key-cylinder, the tumblers and their actuating-springs and the lazy-arm being removed; Fig. 11, a horizontal longitudinal section through the center of the key-cylinder on the line 11 11 of Fig. 9, showing the key as inserted in its slit under the tumblers; Fig. 12, a plan or top view of the key-cylinder; Fig. 13, a side elevation of the same; Fig. 14, a vertical transverse section on the line 14 14 of Fig. 13; Fig. 15, a similar section on the line 15 15 of Fig. 13; Fig. 16, a similar section on the line 16 16 of Fig. 13; Figs. 17 and 18, vertical transverse sections through the key-cylinder on the line 15 15, showing the lazy-arm as encircling the key-cylinder and in its different relative positions thereto; Fig. 19, an enlarged perspective view of the lazy-arm; Fig. 20, a vertical central section, on a greatly-enlarged scale, through one of the tumbler-recesses, to show more clearly the racking or grooving of one of the tumblers and its recess; and Fig. 21, a transverse section on the line 21 21 of Fig. 9, showing the slit through which the lazy-arm works in the tumbler-case.

The improvements herein described are chiefly applicable in that class of tumbler-locks known as "pin-locks;" but some of them are useful in other classes of locks, and they may be used either together, as Yale shows them, or separately, in connection with locks which are wanting in some or all other of the improvements invented by him. These improvements relate partly to the security of locks against picking, partly to methods of construction, rendering the lock easy of adaptation to doors, either right or left hand, or of various degrees of thickness, partly to means of inserting, securing, and working the bolt in its case, and partly to the formation of the key.

I will now proceed to describe them successively in detail, first premising that the lock shown in the drawings is a mortise-lock, and that the improvements are equally applicable to rim-locks.

In the drawings, the case of the lock is shown at A A, having two sides and a plate, as usual in mortise-locks. In each side of the case is a hole, O, having a screw-thread cut in it so as to form a nut, and within the case works the bolt B, provided with talons, as shown or as is usual, and also with a pin or projection, C. Between this pin and the case is secured an elastic plate, D, having in it a guide-slot, *d*, as long as the play of the bolt, to receive the bolt-pin.

The elastic plate tends always to spring upward, as shown in Fig. 4, but may be forced and held downward by the screw E in the position shown in Fig. 3.

The bolt is to be shoved into place, the pin passing below the outer end of the elastic plate and entering its slot at the inner end, and when in place the screw E is to be screwed home, thus acting like a wedge, and forcing the plate down and preventing the bolt from being wholly withdrawn from the lock, while at the same time it can be shot and retracted; and this contrivance for holding a bolt in place, which enables one to insert the bolt through the bolt-hole, and, if desired, after the lock is in position on the door, is a feature of this invention.

A cylindrical case, F, contains the tumblers, their springs, the key-cylinder, and a wing or lazy-arm, G, moved by the key. This tumbler-case has a screw-thread cut on it, corresponding with the screw-threads in the hole O, and it can be screwed into either side of the lock-case, thus making the lock a right or left hand lock.

The annular ring, with its wing or cam G, which actuates the bolt, is only as thick as the slit in the tumbler-case shown in Figs. 7, 9, 10, and 20, at W′, and it can act over any part of the talons from *p* to *q*, Figs. 5 and 7.

The tumbler-case may therefore be screwed in to different depths, thus making the lock suitable for doors of various thicknesses, and still leaving the end of the tumbler-case, which, in the present instance, forms the escutcheon, flush with the face of the door.

The tumbler-case, when set in to the right depth, may be fastened by a jam-nut set up through the bolt-opening before the bolt is in position; but it can also be secured in the lock by a pointed screw, *h*, which screws into either of two nuts or bosses on the inside of the lock-case, one on each side of the lock, and which is only accessible from the front or face part of the lock when the door is open. This screw is to be set up after the tumbler-case has been adjusted into any desired position, so as to firmly hold it there, and it is obvious that the same screw will serve to secure it in one position as well as another.

The contrivance for making the lock either right and left hand, or suitable for different thicknesses of doors, or both, is of this invention.

The tumbler-case has a cylindrical bore longitudinally through it, into which is inserted the small key cylinder or hub H, (or "roll-back," as it is sometimes called,) eccentric to the tumbler-case. This part H has a flange, shoulder, or projection around its outer end, that acts as a stop to determine its true longitudinal position in the tumbler-case. It also has holes for the pins, slides, or tumblers bored nearly through it in planes perpendicular to its axis, as at *r r r*, and the tumbler-case is provided with corresponding holes *r′ r′ r′*. The pins or tumblers for these holes are each made in two pieces, I and J, which are, respectively, of varying lengths, and each is provided with a spring, K. To distinguish these parts for convenience, according to their functions, the parts I may be called the "lifting-pins" or "supplemental tumblers," because their office is to support, and when the key is being inserted to lift, the parts J. While of different lengths, they must all be so short as to be wholly contained within the holes *r r r* of the key-cylinder, the bottoms of which holes furnish bearings within the keyway to limit their downward movement, and, except during the act of inserting the key, or when lifted in a futile attempt to pick the lock, they are not to project beyond its periphery. They revolve with the key-cylinder, and merely serve as the medium of communication between the key and the parts J for locking or unlocking.

The parts J normally rest partly within the tumbler-case and partly within the key-cylinder, thus interlocking the latter and the stationary part of the lock, and they must be raised entirely out of the key-cylinder before it can be revolved; hence they may be called the "locking-pins" or "tumblers" proper.

The key L is a thin flat slip or single piece of sheet-steel, beveled or inclined at its forward end, or on the front side of its first bit, and between its bits, to facilitate insertion and withdrawal under the tumblers, and provided with a shoulder or stop, *x*, that limits its thrust and determines its longitudinal position in the key-cylinder. Its bits are unequal serrations, properly sized to bring the lines of division between the tumblers (see Fig. 9) into the same plane and flush with the periphery of the key-cylinder, so that it may be revolved. The key thus has two functions—first, that of setting the parts by the act of insertion, and, second, that of revolving the key-cylinder and throwing the bolt.

The key-hole is a narrow longitudinal slot in the key-cylinder in a plane parallel with its axis, extending radially through its periphery to about its center, and is therefore mainly on one side of or eccentric to the cylinder.

Until the cylinder is in place the key-hole is imperfect, because one of its walls is wanting; but when in place the tumbler-case closes the lateral opening of the slot, and furnishes a fixed bearing to sustain the key in its operation on the tumblers, thus completing the key-hole. At the outer end of this narrow key-slot the key-hub is dished, or provided with a small concavity, as shown in Figs. 1, 7, and 10, to facilitate the insertion of the key.

In this connection it should be observed the relations of the key and tumblers are such and the key is so constructed that during its insertion in the key-hole it necessarily disturbs and disarranges the tumblers successively which stand in its path, except the last one, before it finally sets them, and in finally setting them it moves them unequal distances. This arrangement adds greatly to the complexity of adjusting the tumblers by any means except the use of the true key, and consequently greatly increases the difficulty of picking the lock.

It is apparent that the tumblers would, if their ends that project into the key-hole were unsupported, be liable to jam in their recesses when an attempt is made to set them by the key; but by observation of the drawings it will be perceived that the key-hole only cuts away a small portion of the bottom of each tumbler-recess in the key-cylinder, (see especially Figs. 8, 11, 14, and 16,) and that the parts of the tumblers projecting into the key-hole are therefore supported by nearly the whole of the circumference of their containing holes or cavities against the thrust of the key. In other words, the key-hole only intersects a small portion of the lower ends of the tumbler-recesses in the key-cylinder, and is of a width less than the greatest cross-sections of the tumblers and tumbler-recesses, and therefore the danger of jamming or binding of the tumblers by the thrust of the key at right angles with the tumblers is obviated.

This plan of a thin key and narrow key hole, in connection with comparatively wide cavities for tumblers, enables one to use racked tumblers in this class of locks. Pin-tumblers at right angles with the key, of greater thickness than the width of the key, are of this invention.

The key-cylinder H has a thin crease or ring-recess cut nearly around it, as at *s*, Figs. 11, 12, 13, 15, 17, and 18, and out of this recess leads a groove parallel with the cylinder's axis, as at *t*, Figs. 3, 4, 7, 9, 10, 12, 16, and 20, which extends to the inside end of the cylinder.

The wing or lazy-arm G, which is stamped or otherwise formed out of a thin piece of sheet-steel, has an aperture through it of the same diameter as the cylinder in all places but one, as at *v*, where a knob projects into the opening, and this knob is a counterpart of the groove *t*, and is thinner than the rest of the wing, so as to enter and fit the recess *s* in the key-cylinder, into which the rest of the wing must be too thick to enter; otherwise it might fall somewhat out of place when in certain positions.

From the outside of the wing projects an arm, W, which is, properly speaking, the wing itself, as it acts directly on the bolt-talons. Two other projections are formed, one on each side of the arm W, whose use will be explained hereinafter.

Figure 21:
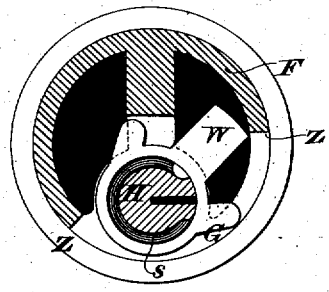

A slit, W′, as wide as the wing is thick, is cut into the tumbler-case perpendicular to its axis, and this slit extends around from Z to Z, Fig. 21, so that the wing may be turned completely within the tumbler-case when the latter is to be screwed into the lock-case.

The manner in which the parts are put together is as follows: All the parts K K, J J, and I I are inserted in their cavities, the parts I I being shoved into their recesses in the key-cylinder as far as possible, and the wing is inserted in its slot W′. The key-cylinder is then shoved into the tumbler-case, with its groove *t* in line with the knob *v*, the parts J J being shoved back in succession to permit its passage, and care being taken that the key-cylinder be not entered in such a position that any of the holes *r r r* and *r′ r′ r′* will come in coincidence while the cylinder is being inserted and before revolving it. The groove *t* will pass over the knob *v*, and the wing will then occupy its proper place in relation to the cylinder, so that the knob *v* may enter the thin ring-recess *s*. If the key-cylinder be now turned till the holes *r r r* are in coincidence with the parts J J, the springs will then cause these parts to enter into the recesses of the key-cylinder above the parts I I, and thus prevent the retraction or further revolution of the cylinder, which, being once in place, cannot be revolved except by the use of the key.

It will be observed that one of the tumblers passes nearer the rear end of the cylinder than the wing, thus filling the groove *t*. When the key is in, it must hold the innermost tumbler J out of, and the innermost tumbler I into, the groove *t*, or else the cylinder cannot revolve, and as long as it so holds it the cylinder cannot be withdrawn from the case, because the pin will be struck by the knob *v* of the wing. The wing therefore holds the cylinder that contains the key-hole in place, and this is one of its offices.

By observation of Figs. 17 and 18, it will be perceived that the key-cylinder can turn nearly a whole revolution without moving the wing, (which is therefore called a "lazy-arm,") and as the key cannot be removed except when both parts of the pins or tumblers are in line, the key-cylinder must move a whole revolution both in locking and unlocking.

If the wing, as I have shown it, moved at all times with the cylinder, it would have to make a whole revolution, and would, of necessity, be out of contact with the bolt-talons both when the lock was locked and unlocked. By making it move less than a whole revolution, one is enabled to keep the wing W in contact with a bolt-talon both when the lock is locked and unlocked, (see Figs. 3 and 4,) and thus make the wing itself a stop, preventing forcing the bolts. This function of the wing is due to its moving only through an arc of a circle while the key-cylinder that actuates it moves an entire revolution; but I do not claim that such construction and arrangement are new.

In this class of pin-locks the key can be removed and inserted only when both parts of the pins are in line, and it is useful to have some guide or stop which always causes the cylinder to come to rest in the position where the pins are in line. For this purpose there is formed upon the wing two knobs, one on each side of the arm W, and by inspection of Figs. 3 and 4 it will be perceived that one or other of these knobs will strike against a talon when the lock is either locked or unlocked, thus preventing further rotation of the cylinder, and forcing it to come to rest with both parts of the pins in line, so that the key may readily be inserted or withdrawn when the lock is either locked or unlocked.

The same effect might be produced by providing proper stops for the wing W to strike against, and it is intended to use this plan as an equivalent for the other in some cases. This is the third function of the wing or lazy-arm, and it is clear that one of these functions might be performed without the others. For instance, the wing might be a mere ring with a knob, such as *v*, and in that case it would prevent removal of the cylinder, while another arm secured to the cylinder and moving with it might shoot the bolt, and some other stop might be used, or no stop at all; or the wing might be so made as to possess its function as a lazy-arm, thus moving the bolt and obviating the use of a separate bolt-stop, while it neither held the cylinder in place nor operated to prevent its revolution when the pins were in line; or it might merely act to stop the revolution of the cylinder containing the key, and act neither to shoot the bolt nor to hold the key containing cylinder in place.

The cylindrical tumbler-chamber might contain other kinds of tumblers, and still be useful as a means of making a lock either left or right hand, or applicable to different thicknesses of doors.

This invention, it will now be perceived, is distinguished by several marked characteristics of a typical nature in locks. One of these is, that there are provided two distinct cases, joined together, and separable and adjustable with respect to each other, for adaptation of locks to doors right and left, and of different thicknesses, one of which is the main lock-case containing the bolt, and the other of which is the tumbler-case controlling all of the immediate key-actuated mechanism. Another is, that the key itself is of sheet metal and of peculiar formation. Another is, that the lock-bolt is peculiarly secured within and detachable from the lock-case. But the exact and distinctive nature and scope of the invention in its various parts will now be particularly set forth in the claims.

What is claimed as of the invention and improvements in locks of the said LINUS YALE, Jr., deceased, is—

1. The combination of a set-screw with an elastic bolt-guide and bolt, substantially as described, for detachably securing a bolt in a lock-case.

2. The combination of a pointed set-screw, operating like a wedge, a slotted elastic bolt-guide, and a bolt provided with a lug or projection, substantially as described.

3. The combination of a lock-case containing a bolt and a separate tumbler-case or escutcheon containing the tumblers or locking mechanism to be actuated by the key, the tumbler-case being adjustable with respect to the lock-case, to adapt the lock to varying thicknesses of doors, or to either a right or left hand door, substantially as described.

4. An independent escutcheon or tumbler-case carrying all the key mechanism, screw-threaded, for the purpose of adjusting and securing it to a lock-case, substantially as described.

5. The combination of a lock case containing a bolt, a tumbler-case or escutcheon containing tumblers or the locking mechanism to be actuated by the key, and a fastening device, located between the escutcheon and the face-plate of the lock-case, for securing the escutcheon in its position when properly set or adjusted relatively to the lock-case, said fastening device, when the lock is in use, being accessible only when the door is open, substantially as described.

6. The combination of a screw-threaded lock-case containing a bolt, a screw-threaded escutcheon or tumbler-case containing tumblers or the locking mechanism to be actuated by the key, and a set-screw and one or more internally screw-threaded sockets, located between the escutcheon and the face-plate of the lock-case, so as to be accessible when the lock is in use only from the edge of the door when the door is open, substantially as described.

7. The combination of an independent escutcheon or tumbler-case and a key-cylinder contained and revolving therein, each provided with one or more transverse coincident tumbler-recesses, substantially as described.

8. The combination of an independent escutcheon or tumbler-case, a key-cylinder contained and revolving therein, and one or more transverse tumblers contained partly within the tumbler-case and partly within the key-cylinder, whereby the key-cylinder is interlocked with the fixed part of the lock, substantially as described.

9. The combination of an independent escutcheon or tumbler-case, a key-cylinder contained and revolving therein, and one or more transverse tumblers, I J, one of which is contained wholly within the key-cylinder, and revolves with it, and the other of which projects from its recess in the tumbler-case into the key-cylinder, except when the key is in place, substantially as described.

10. The combination of a tumbler-case and a key-cylinder contained and revolving therein, both provided with one or more coinciding transverse tumbler-recesses, the key-cylinder having a key-slot intersecting its tumbler-recesses of a lateral width less than the corresponding dimension of said recesses, substantially as described.

11. The combination of a case containing tumblers, a flat sheet-metal key for setting the tumblers, and a key hub or cylinder contained within the case and having a radial eccentric key-slot, which guides and supports the flat key during its insertion and rotation, substantially as described.

12. The combination of an escutcheon or tumbler-case for containing the tumblers or locking mechanism to be actuated by the key, and a rotating key cylinder or hub contained within the same, when the axis of the key-hub is parallel with but eccentric to the axis of the escutcheon, substantially as described.

13. The combination of a key-cylinder having a longitudinal key-slot cutting its periphery parallel with its axis, and extending radially to about its center, so as to be on one side of or eccentric to the cylinder, with a surrounding stationary case, forming one wall of the key-slot, whereby the key is retained in the slot during its revolution, substantially as described.

14. The combination of a key-cylinder, radially slotted upon one side for the reception of a sheet-metal key, and sliding tumblers wider than the keyway, which normally rest across the keyway, upon bearings which limit their downward throw, so as to be adjusted by the insertion of the key, and then to turn with it and the key-cylinder, substantially as described.

15. A key cylinder or hub containing a keyway for a sheet-metal key, provided at one end with a projecting head or flange, and at the other with a wing, arm, or cam, whereby said cylinder is secured longitudinally in its place in the lock, substantially as described.

16. The combination of an annular knobbed ring with a grooved key-cylinder, substantially as described.

17. A flat key composed of a single piece of metal, beveled or inclined at its forward end, or on the front side of its first bit, and between its bits, for easy insertion and withdrawal under tumblers, substantially as described.

SILAS N. BROOKS,
*Administrator.*

Witnesses:
C. C. KOHLSAAT,
GEO. W. STANFORD.